(12) United States Patent
Broussard, Jr.

(10) Patent No.: US 6,916,989 B2
(45) Date of Patent: Jul. 12, 2005

(54) PROTECTIVE ELECTRICAL OUTLET DEVICE

(76) Inventor: Harry Broussard, Jr., 5655 Glenmont Dr., #104, Houston, TX (US) 77081

( * ) Notice: Subject to any disclaimer, the term of this patent is extended or adjusted under 35 U.S.C. 154(b) by 173 days.

(21) Appl. No.: 10/627,523

(22) Filed: Jul. 24, 2003

(65) Prior Publication Data
US 2004/0074663 A1 Apr. 22, 2004

Related U.S. Application Data
(60) Provisional application No. 60/398,273, filed on Jul. 24, 2002.

(51) Int. Cl.[7] ................................................. H02G 3/14
(52) U.S. Cl. .......................... 174/66; 174/67; 220/241; 220/242
(58) Field of Search .................... 174/66, 67; 220/241, 220/242; 200/331

(56) References Cited
U.S. PATENT DOCUMENTS

| | | | | |
|---|---|---|---|---|
| 3,859,454 A | * | 1/1975 | Mann .......................... | 174/66 |
| 5,577,602 A | * | 11/1996 | Conner et al. ............. | 174/66 X |
| 5,577,603 A | * | 11/1996 | Bogdanovs et al. ........ | 200/331 |
| 5,804,765 A | * | 9/1998 | Siemon et al. ............ | 174/65 R |

* cited by examiner

Primary Examiner—Dhiru R Patel
(74) Attorney, Agent, or Firm—Kurt S. Myers

(57) ABSTRACT

The protective electrical outlet device of the present invention is directed to an electrical cover plate, a cover that slides in slots in the cover plate, and a slide plate with male engagement fingers that lock or hold the cover securely in place.

4 Claims, 5 Drawing Sheets

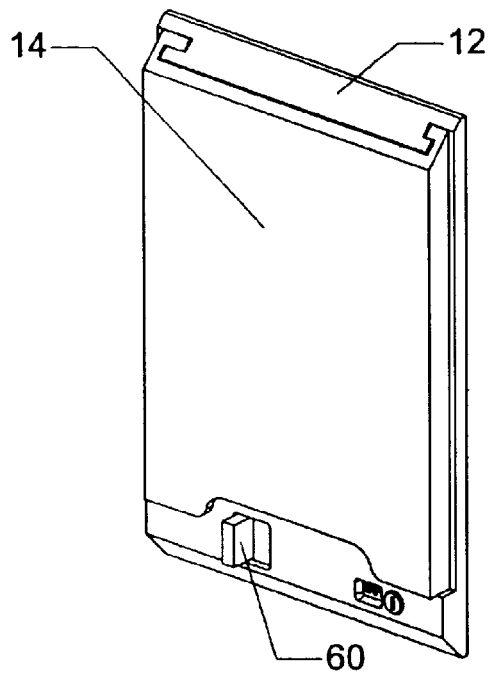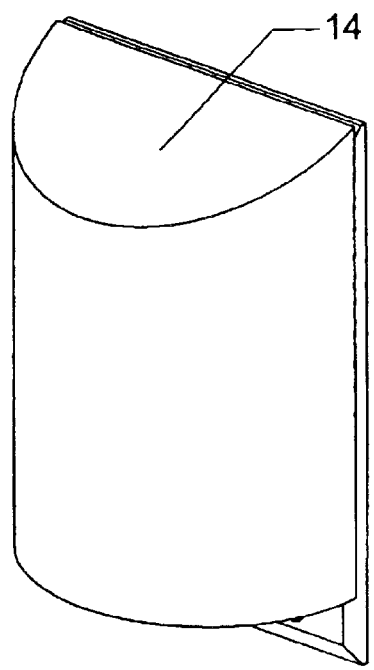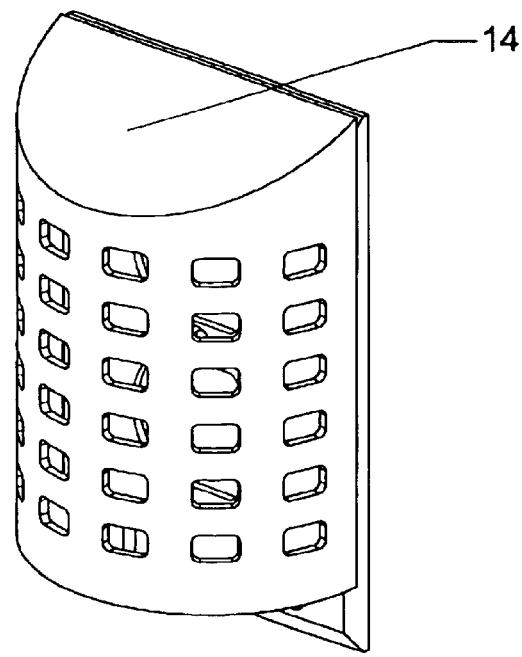
Fig. 6
Fig. 7
Fig. 8

PROTECTIVE ELECTRICAL OUTLET DEVICE

RELATED APPLICATION

This application is based on provisional application Ser. No. 60/398,273, filed Jul. 24, 2002, entitled "Protective Electrical Outlet Device".

FIELD OF THE INVENTION

This invention is directed to a child protective electrical outlet device. The device is to replace the socket plates that expose usually two sockets to secure the cords of electrical appliances and electrical sockets from the hands of small children and pets.

BACKGROUND OF THE INVENTION

U.S. Pat. No. 4,674,813 discloses a theft protection system for an electrical instrument including a metal jacket power cord having an enlarged plug at each end.

U.S. Pat. No. 4,968,856 discloses a safety cover for an electrical outlet comprising a slidable cover for partially or completely covering the electrical outlet, a housing defining therein a track to guide the cover and a connector for securing the housing to the electrical outlet.

U.S. Pat. No. 5,165,042 discloses a cover plate employing a decorative face plate slid ably mounted on a decorative receptacle for movement between an open position and a covered position.

U.S. Pat. No. 5,212,347 discloses a plate that decoratively covers a light switch or a convenience outlet on a wall using a sliding member to cover or actuate the electrical device.

U.S. Pat. No. 5,961,336 discloses a safety device designed to have a cover. Attached to the cover is a removable cover which slides into place and affirmatively locks.

U.S. Pat. No. 6,031,183 discloses an electrical outlet cover, cord and plug combination that includes a wall plate covering a wall outlet and receiving a cover there over to preclude access by children.

U.S. Pat. No. 6,342,676 discloses a safety guard device for an electrical outlet provided with a base plate adapted to be fixed to an electrical receptacle containing at least one aperture for registry with the electrical receptacle, and a cover plate in slidable engagement with the base plate for covering the base plate. A locking device is provided between the base plate and the cover plate locking the plates relative to each other.

U.S. Pat. No. 6,372,987 discloses a safety guard for an electrical wall outlet that includes a base plate adapted to be fixed to an electrical receptacle. The base plate containing at least one aperture that is in registry with the electrical receptacle. A cover plate that is in slidable engagement with the base plate for covering the base plate and containing an aperture that is positioned to provide selective registry with the aperture in the base plate.

SUMMARY OF THE INVENTION

The protective electrical outlet device of the present invention is directed to an electrical cover plate, a cover that slides in slots in the cover plate, and a slide plate with male engagement fingers that lock or hold the cover securely in place.

BRIEF DESCRIPTION OF THE DRAWINGS

FIG. 6 is an alternative cover that is flat when nothing is plugged into the electrical socket;

FIG. 7 is an alternative cover that is larger when two cords or a larger plug is plugged into the electrical socket; and FIG. 8 is an alternative cover that has opening when a light or air freshener is plugged into the electrical socket;

BRIEF DESCRIPTION OF THE EMBODIMENTS OF THE INVENTION

The present invention is directed to a replacement for the usual electrical socket plate that has openings for the two sockets in the wall and more than covering the edges of the wall board at the electrical junction, covers the sockets from the hands of small children and pets. The protective electrical outlet device of the present invention is directed to an electrical cover plate, a cover that slides in slots in the cover plate, and a slide plate with male engagement fingers that lock or hold the cover securely in place.

Figure 1:
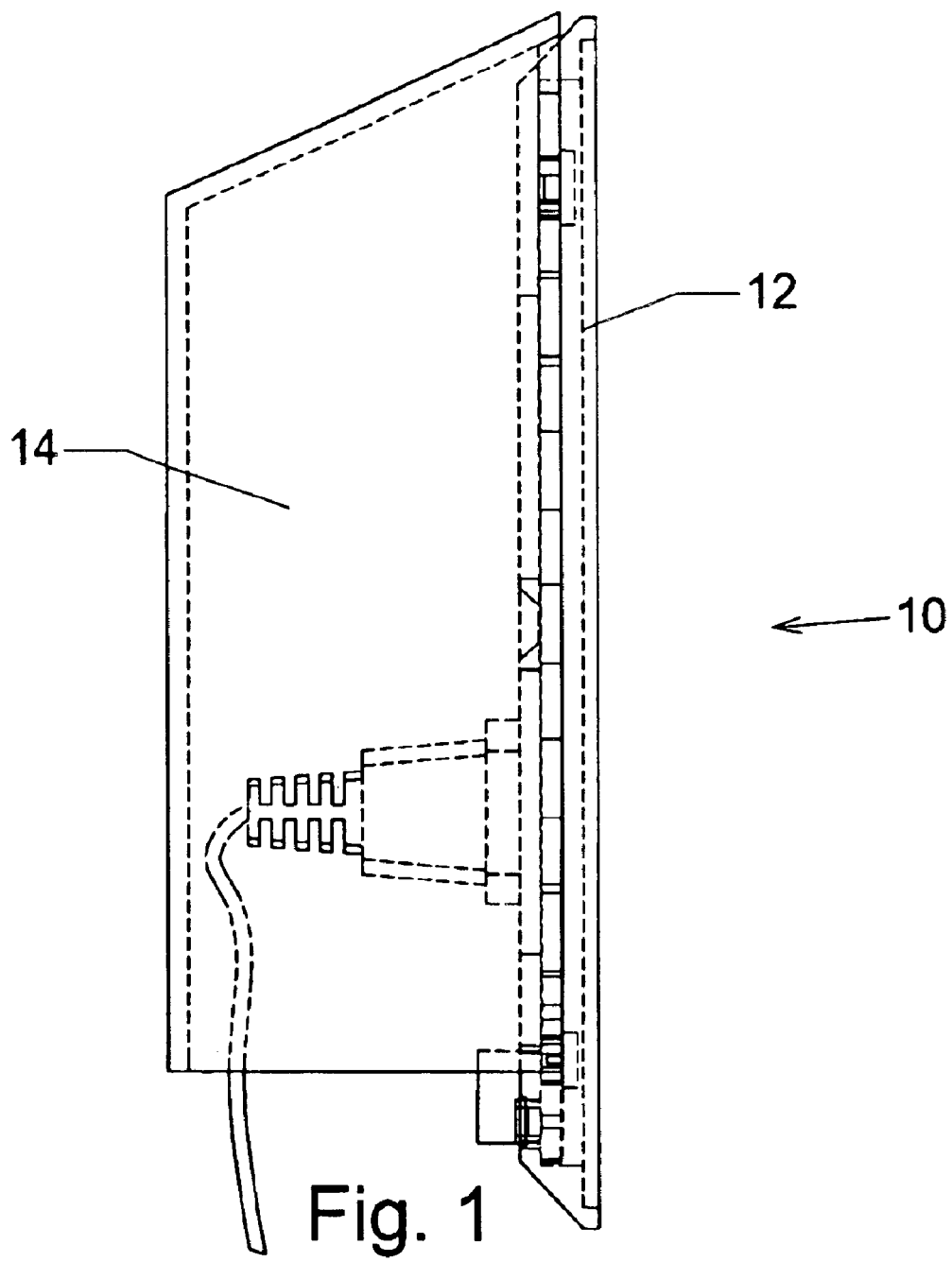
FIG. 1 is a side cross-section showing the device of the present invention covering a electrical plug that is plugged into an electrical socket.

Referring to FIG. 1, the device 10 of the present invention is a protective electrical outlet device comprising three major parts; namely, a cover plate 12; a cover 14 that is held by the cover plate 12 and a slide plate 16 (not shown in FIG. 1). The cover plate replaces the usual plate that hides the wiring end permits the electrical socket or sockets to be flush with the plate and wall.

Figure 2:
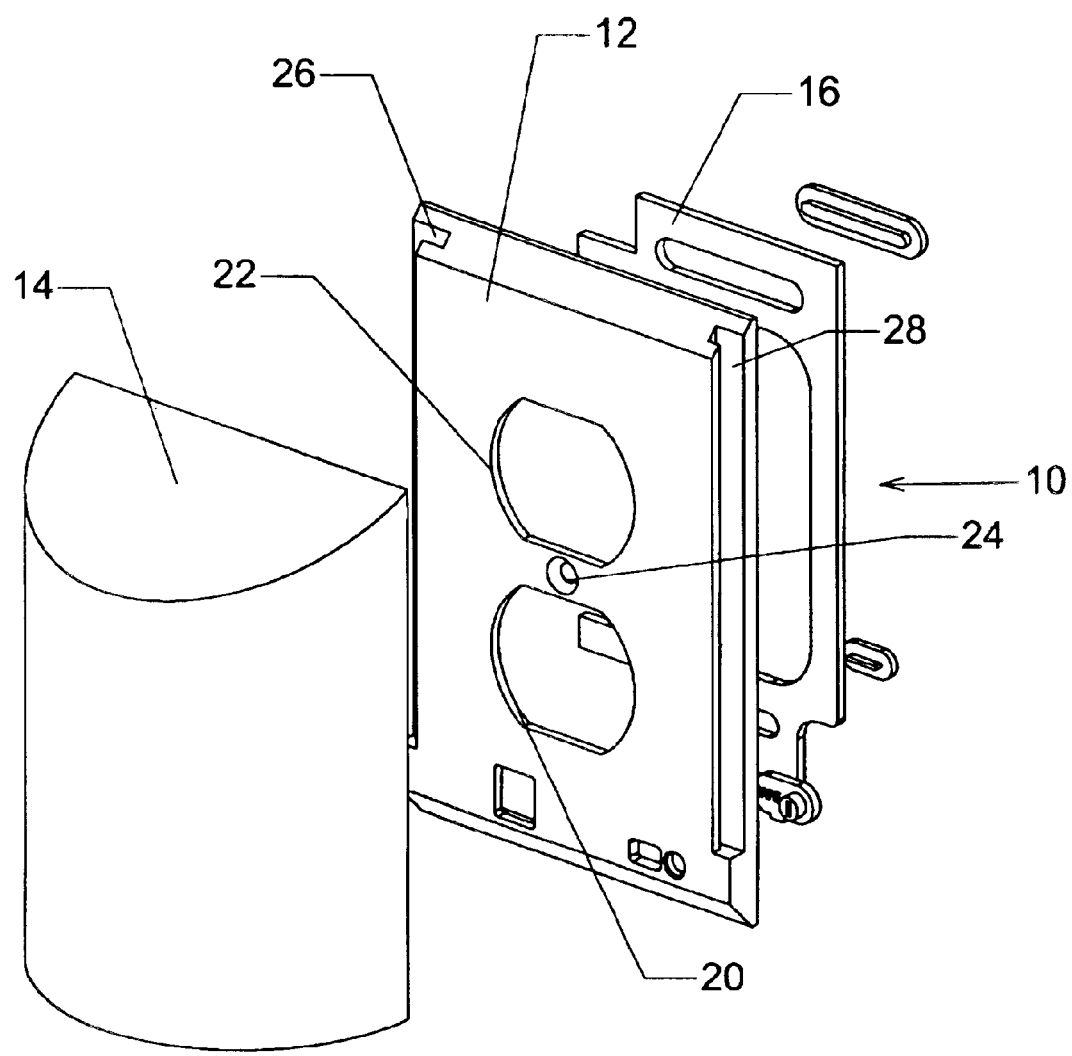
FIG. 2 is an isometric front view of the individual parts of the present invention.

Referring to the exploded view of the device 10 in FIG. 2, the three major parts are shown with the cover 14 in front of the cover plate 12 and the slide plate 16 behind the cover plate 12. The cover plate 12 has openings 20 and 22 for two electrical sockets, as in most homes and businesses. An opening 24 between the openings 20 and 22 is for the screw that will be used to replace the usual plate. On both sides of cover plate 12 is a channel 26 and 28 respectively. The cover 14 is held in these channels 26 and 28, as will be explained in detail hereinafter.

Figure 3:
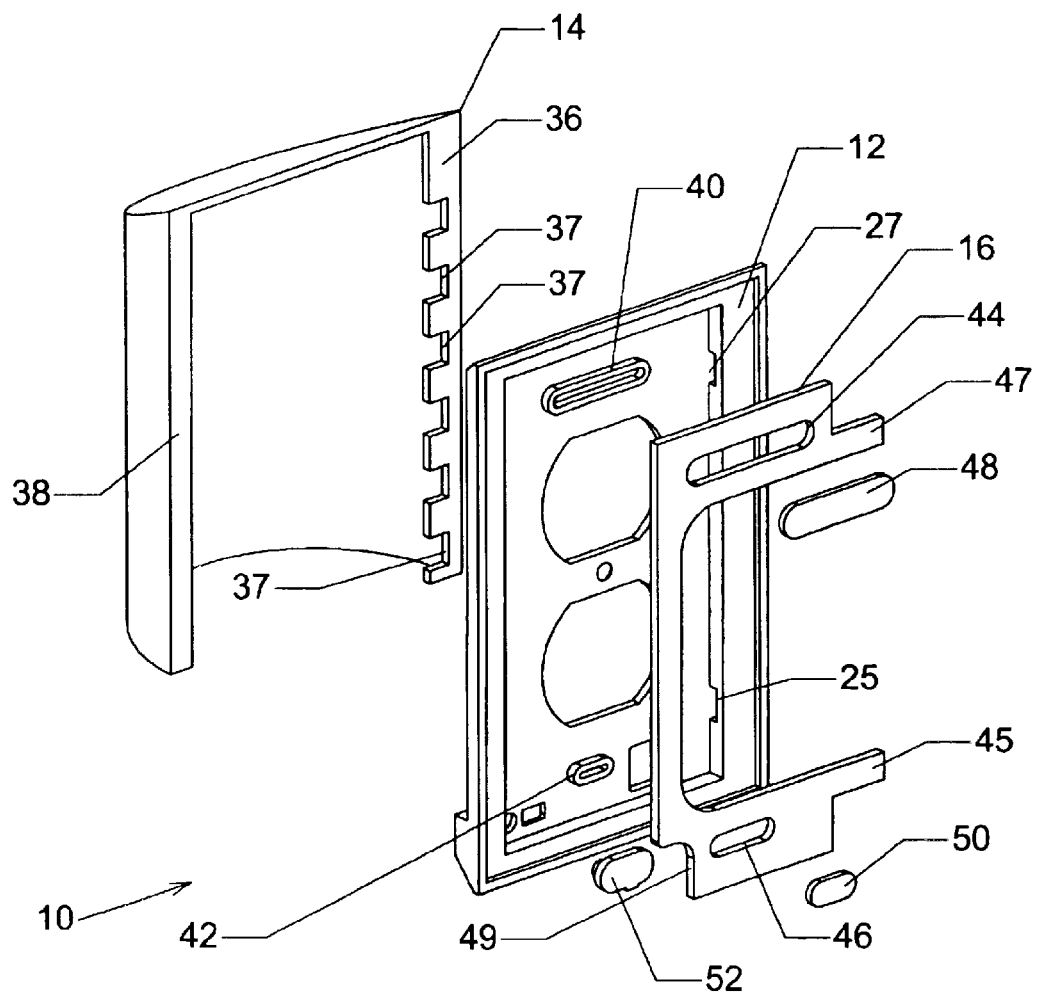
FIG. 3 is an isometric back view of the individual parts of the present invention.

Referring to the exploded view of the device 10 in FIG. 3, the three major parts are shown from the rear or backside of the device. Shown are slide plate 16; the cover plate 12 and the cover 14. From this perspective, the back of the cover 14 is seen to have two slide members 36 and 38 respectively that slide in channels 26 and 28 respectively. The slide member 36 has a number of slots 37, the purpose of which will be explained hereinafter.

Still referring to FIG. 3, the back of plate 12 has two alignment bosses 40 and 42 that keep the slide plate 16 aligned. The slide plate 16 has openings 44 and 46 so that the slide plate 16 may be placed on the alignment bosses 40 and 42. The slide plate 16 is held on the bosses 40 and 42 by slide guide covers 48 and 50 so that the slide plate 16 may be easily moved from side-to-side on the bosses. The slide plate 16 has a lower male engagement finger 45 and upper male engagement finger 47 that when held by the bosses 40 and 42 are aligned with opening 25 and 27, respectively, in the cover plate 12. In the lower corner of slide plate 16 opposite the male engagement fingers 45 and 47 is an elliptical slot 49. An elliptical safety latch 52 is affixed to the back of cover plate 12 such that when the elliptical shape of latch 52 matches elliptical slot 49 that slide plate 16 is in the position shown in FIG. 4.

Figure 4:
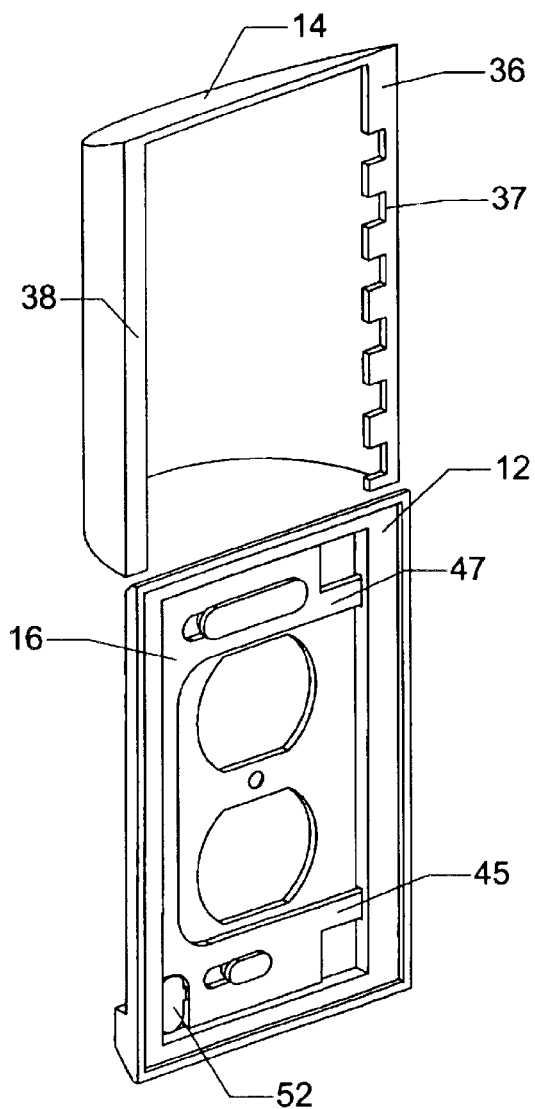
FIG. 4 is an isometric view of the assembled parts in the unlocked position where the cover slides into the cover plate.
Figure 5:
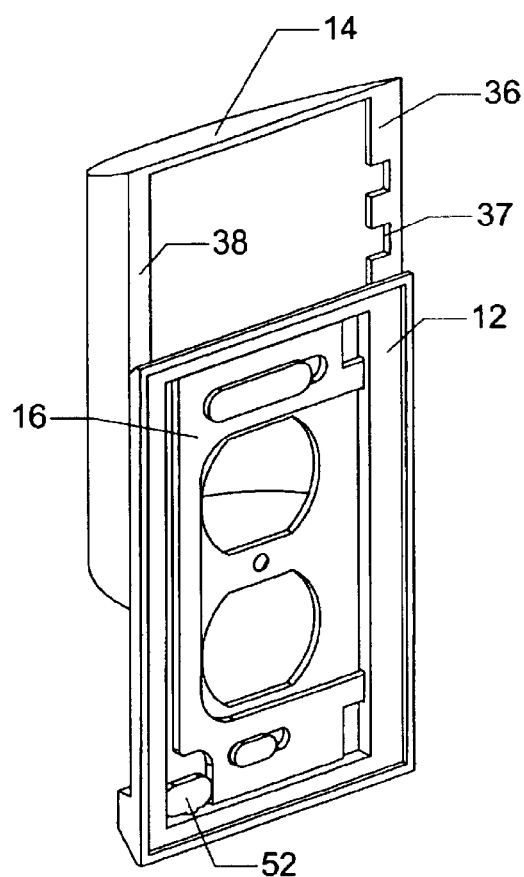
FIG. 5 is an isometric view of the assembled parts in the locked position where the cover is in a fixed position in the cover plate.

Referring to FIG. 4 and FIG. 5, the cover 14 is affixed to cover plate 12 as shown in FIG. 4. The slide members 36 and 38 on the rear of cover 14 slide in the channels in the front of cover plate 12. The cover is positioned where desired to cover one or more electrical sockets of the cover plate 12. As shown in FIG. 5, the safety latch 52 is turned with a screw driver inserted into the head of the screw on the outside of cover plate 12 and the latch 52 is moved to the position as shown that moves sliding plate 16 to the right as viewed from the rear. The male engagement fingers 45 and 47 pass through the openings 25 and 27 and male engagement fingers 47 will slide into a slot 37 of cover 14. It may require a slight raising or lowering of the cover 14 for the male engagement finger 47 and slot 37 to be aligned. Once aligned and the latch 52 turned 90° from the position in FIG. 4, the cover 14 is made secure with the cover protecting one or more of the electrical sockets. If small children are involved, it may be desired to place the cover 14 such that all electrical sockets are protected, whereas, it animals are the cause of electrical lines being tampered with, then only the socket that have an electrical plug in the socket may be made secure.

Referring now to FIG. 6, on the front side of slide plate 16 is a handle means 60 that is placed in opening 62 of cover plate 12. The handle means 60 is used to move the slide plate 16 from the open to the secured position when male engagement finger 47 of slide plate 16 is moved into slots 37 of the cover 14. The handle 60 is also used to remove the cover 14.

Also illustrated in FIG. 6 is a flat cover 14 used when nothing is plugged into any of the electrical sockets. In FIGS. 7 and 8, these figures illustrate that the cover 14 may have more than one design. Specifically, the covers of FIG. 7 may be a large cover 14 for utility or larger cords or a small cover for telephone or small cords. The cover in FIG. 8 illustrates a cover 14 that has a plurality of openings in the surface for use with an air freshener plugged into an electrical socket or a night light.

What is claimed is:

1. A protective electrical outlet device comprising:

an electrical cover plate having a front face and a back face, said front face having channels that are on each side of said cover plate;

a cover that slides in said channels in said cover sheet; and a slide plate with male engagement fingers that slides on said back face of said cover plate to hold said cover securely in place.

2. A protective electrical outlet device according to claim 1 wherein said back face of said cover plate has at least one alignment boss to keep said slide plate aligned.

3. A protective electrical outlet device according to claim 1 which further includes:

handle means for moving said slide plate into engagement with said cover.

4. A protective electrical outlet device according to claim 1 which further includes:

an elliptical slot that secures said slide plate when turned.

* * * * *